United States Patent
Bergmann et al.

[19]

[11] Patent Number: 6,112,000
[45] Date of Patent: Aug. 29, 2000

[54] REFLECTIVE ARRAY MULTIPLEXER WITH POLARIZATION COMPENSATION

[75] Inventors: Ernest Eisenhardt Bergmann, Fountain Hill, Pa.; Gustav Edward Derkits, New Providence, N.J.; Ralph Stephen Jameson, Allentown, Pa.

[73] Assignee: Lucent Technologies Inc., Murray Hill, N.J.

[21] Appl. No.: 09/143,921

[22] Filed: Aug. 29, 1998

[51] Int. Cl.[7] ........................................ G02B 6/26
[52] U.S. Cl. .................. 385/47; 385/15; 385/24; 385/37; 385/46; 359/115; 359/124; 359/127; 359/130
[58] Field of Search .................. 385/15, 24, 37, 385/46, 47; 359/124, 127, 130, 115

[56] References Cited

U.S. PATENT DOCUMENTS

| 4,904,042 | 2/1990 | Dragone . | |
| 5,341,444 | 8/1994 | Henry | 385/11 |
| 5,546,483 | 8/1996 | Inoue | 385/14 |
| 5,745,616 | 4/1998 | Zirngibl | 385/37 |

OTHER PUBLICATIONS

Takahashi et al., "Polarization– insensitive arrayed–waveguide . . ." Optics Letters, vol. 17, No. 7, Apr. 1992, pp. 499 et. seq.

*Primary Examiner*—Cassandra Spyrou
*Assistant Examiner*—Leo Boutsikaris
*Attorney, Agent, or Firm*—Wendy W. Koba

[57] ABSTRACT

An optical multiplexer is formed that overcomes the polarization dependence of conventional DWDM routers and is also significantly smaller than prior art routers. A reflective router is formed that utilizes one-half of a star coupler, with a reflective surface formed along the planar face of the coupler so as to form a "folded" arrangement. First and second waveguide arrays are coupled to opposing quadrants of the folded coupler, with the reflective surface providing the coupling therebetween. A quarter wave plate (or Faraday rotator) and reflective surface are disposed at the output of the second waveguide array and are used to provide a TE/TM mode conversion to the optical signals exiting the second array (thereby canceling out any polarization-dependent effects). The reflective surface beyond the quarter wave plate re-directs the optical signal back through the second waveguide array. The signal will then again reflect through the folded coupler and exit the multiplexer through the first waveguide array. The pair of reflective surfaces function to "fold" the router along two axes, thereby reducing the overall size of the router by 75% when compared with prior art arrangements.

9 Claims, 5 Drawing Sheets

REFLECTIVE ARRAY MULTIPLEXER WITH POLARIZATION COMPENSATION

BACKGROUND OF THE INVENTION

1. Technical Field

The present invention relates to a broadband optical array multiplexer and, more particularly, to a reflective array structure that provides polarization compensation and yields an array of substantially reduced wafer area when compared with prior art multiplexers.

2. Description of the Prior Art

Optical wavelength division multiplexers, in particular "dense" multiplexers have become standard optical components that are capable of being implemented as planar lightguide circuits using planar lightwave circuit (PLC) technology. The basic dense wavelength multiplex (DWDM) router is disclosed in U. S. Pat. No. 4,904,042 issued to Corrado Dragone on Feb. 27, 1990. Often referred to as a "Dragone router" the disclosed N×N router is capable of launching an optical signal into any one of N inputs and, by controlling the wavelength, allowing the signal to appear at one of N outputs. The device is reciprocal in form and as such is also capable of performing as a demulitplexer. The capability to provide routing between any arbitrary input and output is achieved by forming the coupler to have opposing circular surfaces with each circular surface passing through the center of curvature of the other. FIG. 1 is an illustration of an exemplary prior art Dragone router.

The planar nature of the waveguide construction of routers such as that illustrated in FIG. 1 tends to produce a degree of polarization dependence in the group index of refraction of each waveguide. In any event, there is often observed a polarization-dependent offset of wavelength dependent characteristics. Also, the size of some Dragone routers becomes problematic as N increases, since there is a minimum bend radius that a given waveguide technology will support.

One approach to solving the polarization-dependent problem, proposed by H. Takahashi et al. in an article entitled "Polarization Insensitive Arrayed-Waveguide Grating Wavelength Multiplexer on Silicon" appearing in *Optics Letters*, Vol. 17, No. 7, April 1992, is to insert a birefringent quartz plate at the midpoint between successive routers so that the TE and TM polarizations are interchanged. FIG. 2 is a prior art illustration of this proposal. Although the effects of birefringence will be cancelled with this arrangement, the insertion of the quartz plate results in adding a loss of approximately 5 db to the signal path. Also, the capability of processing the silicon substrate to form a slot for the quartz plate is somewhat problematic.

A need remains, therefore, for an optical router architecture that is more compact than a conventional Dragone router and does not exhibit the polarization-dependent characteristics of such routers.

SUMMARY OF THE INVENTION

The need remaining in the prior art is addressed by the present invention, which relates to a broadband optical array multiplexer and, more particularly, to a reflective array structure that provides polarization compensation and yields an array of substantially reduced area when compared with the prior art.

In accordance with the present invention, a router may be formed that is approximately one-fourth the size of a conventional Dragone router by introducing three additional elements to the optical structure. First, a high reflectively surface (100% reflective) is disposed along a first edge of the optical substrate so as to intersect a midpoint of a conventional star coupler (thus, the coupler is "folded" in half when compared to the layout of a conventional prior art design). The N input waveguides are coupled to the folded coupler such that the signals passing therethrough will reflect off of the edge surface and be directed to a set of N output waveguides coupled to the opposing quadrant of the folded coupler. The N output waveguides thereafter propagate across the surface of the substrate to exit along another edge. This exit edge is first coupled to a quarter wave plate (or Faraday rotator), where the output side of the quarter wave plate (Faraday rotator) is coated with a highly reflective (100%) material. Therefore, any signals propagating along an output waveguide will pass through the quarter wave plate (Faraday rotator) and impinge the reflective surface, which is disposed to re-direct the signal back into the same waveguide. Thus, the signal will again pass through the quarter wave plate, along the waveguide, through the folded coupler and be re-injected into an input waveguide. The utilization of the reflective surface at the output of the coupler beyond the quarter wave plate can be thought of as "folding" a conventional Dragone router in half again (the final coupler, therefore, being one-quarter the size of a prior art Dragone router), thus efficiently compacting the size of a conventional router. The utilization of the quarter wave plate/reflector (or Faraday rotator) combination performs the same polarization compensation function as the half wave plate of the prior art (since the optical signal will pass through the quarter wave plate twice), with the reflector again "folding" the router geometry of the prior art and reducing the size of the overall array.

In a preferred embodiment of the present invention, RIE techniques can be used to convert from waveguide modes to collimated beams at the quarter wave plate exit face of the substrate. The formation of collimated beams allows for a conventional Faraday rotator to be used as a polarization converter (since the collimation results in increasing the working distance present at the waveguide exit).

Various geometries of a reflective router of the present invention are possible. That is, the waveguides may be disposed to enter/exit along opposing substrate edges or, alternatively, along a single edge, thereby simplifying optical coupling and packaging concerns. The star coupler may be disposed along an edge either orthogonal to or parallel to the waveguide ports.

Additional aspects and variations of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
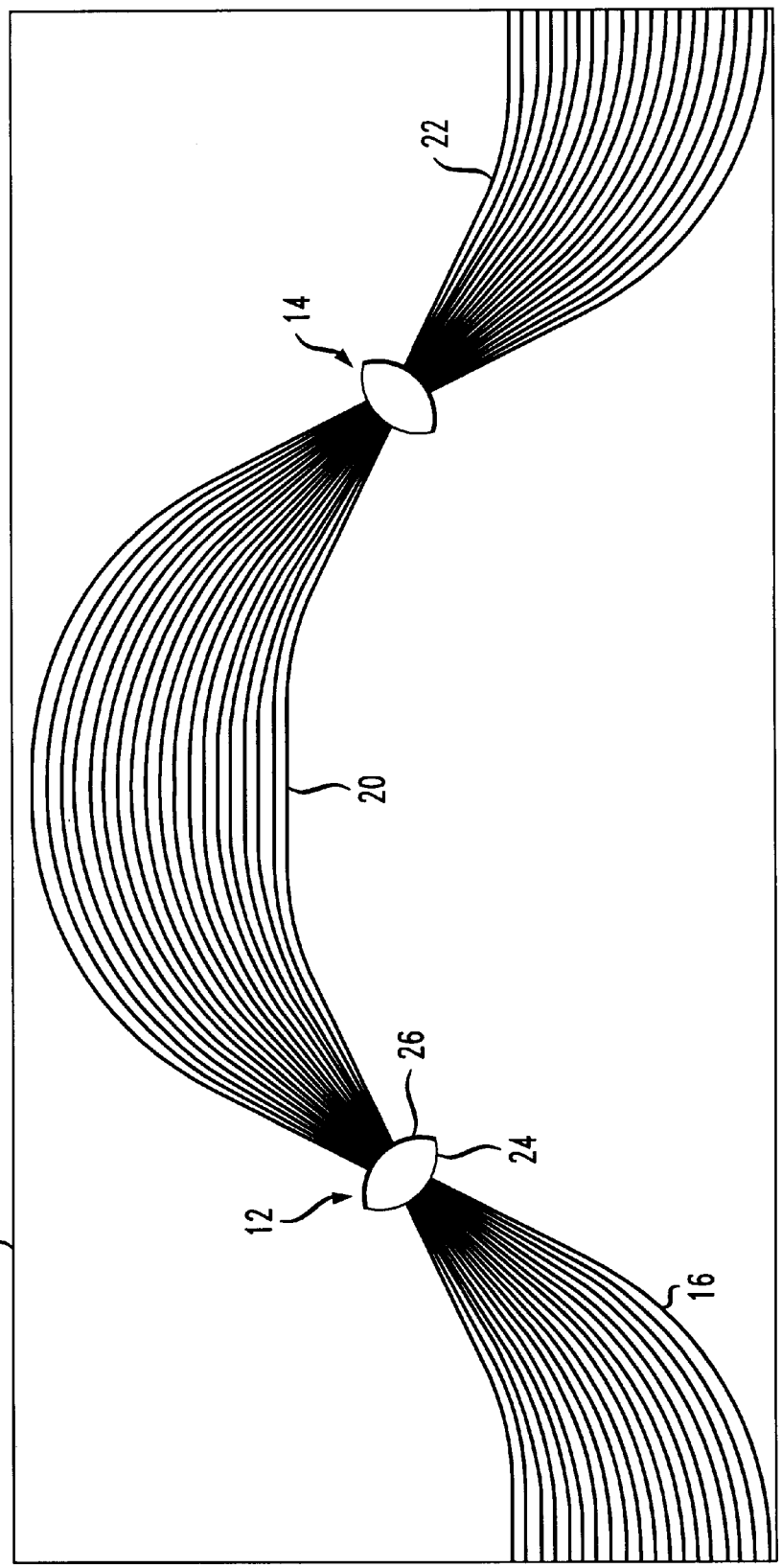
FIG. 1 illustrates a conventional prior art Dragone router.

As briefly discussed above, FIG. 1 illustrates a conventional prior art "Dragone" router 10. Router 10 includes a first star coupler 12 formed of appropriately disposed and shaped regions of high refractive index material formed in top surface area of substrate 18 and a similarly-formed second star coupler 14. A plurality of N input waveguides 16 are formed in the top surface of optical substrate 18 and are used to couple input optical signals (via, for example, optical fibers (not shown)) into first star coupler 12. A plurality of N intermediate waveguides 20 are coupled between first star coupler 12 and second star coupler 14. A plurality of N output waveguides 22 are disposed between the output of second star coupler 14 and an opposing edge of substrate 18. In accordance with the Dragone router technology, the curvature of surfaces 24 and 26 of star coupler 12 (as well as the surfaces of coupler 14) are designed as circular arcs, where each arc intersects the center of the opposing surface. This geometry has been found to allow the divided optical signal to be delayed by a different amount from guide to guide within the plurality of intermediate waveguides 20 (typically a linearly increasing amount) and an optical signal propagating along an input waveguide to be selectively coupled, upon recombination in second star coupler 14, into a predetermined output waveguide by controlling the wavelength of the optical signal. As mentioned above, a problem with conventional Dragone routers is that they tend to be polarization dependent.

Figure 2:
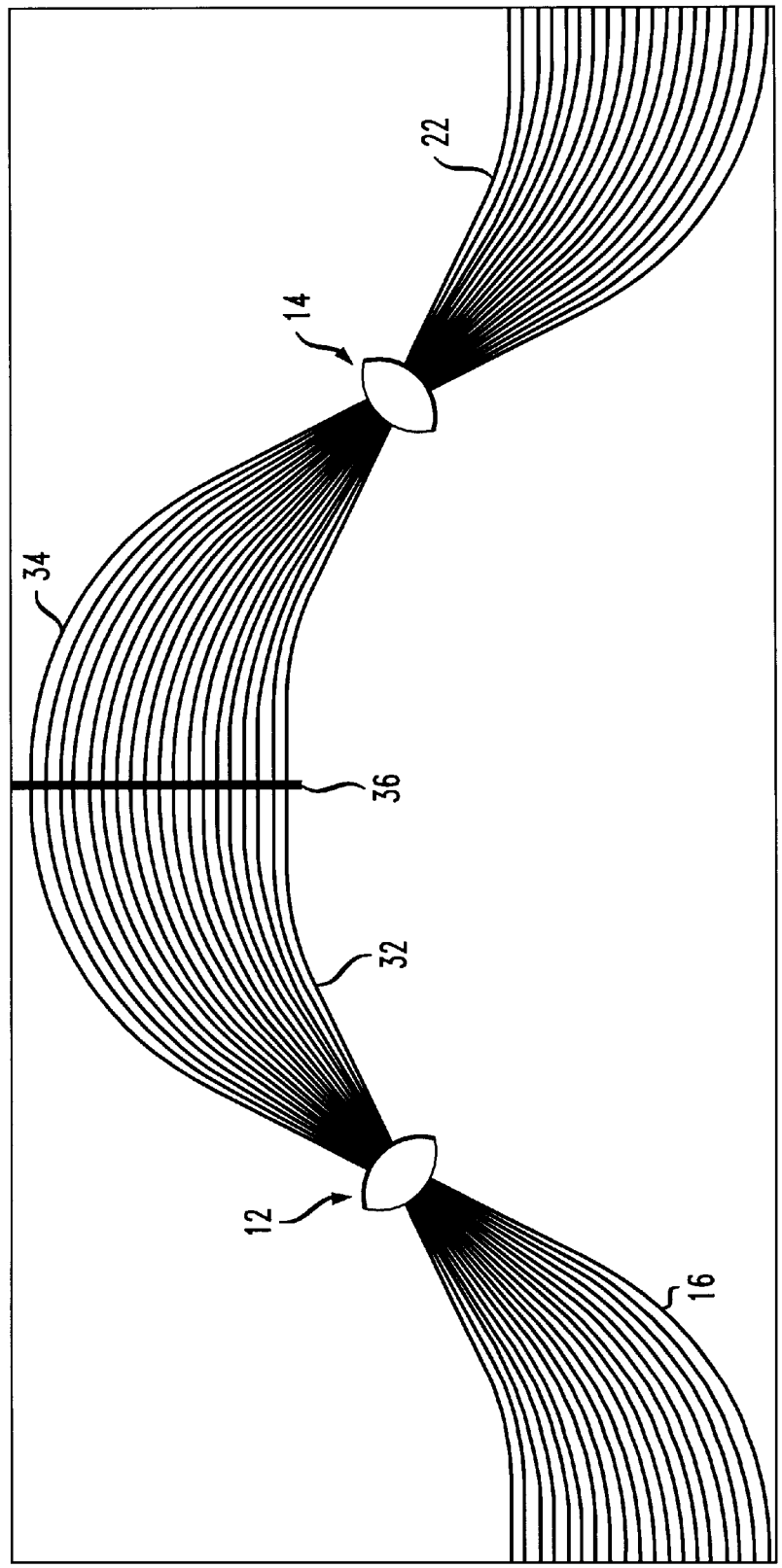
FIG. 2 is a diagram of a prior art router including a polarization compensating half-wave plate.

A prior art solution to the polarization dependent problem is illustrated in FIG. 2. Router 30 of FIG. 2 is similar to router 10 of FIG. 1 with respect to utilizing a pair of star couplers 12, 14 and an array of N input waveguides 16 and N output waveguides 22. However, intermediate waveguides 20 of router 10 are replaced in this version with a first array of "half" waveguides 32 and a second array of "half" waveguides 34 with a half wave plate 36 disposed therebetween. Half wave plate 36 may comprise, for example, quartz or any other appropriate birefringent material. By inserting half wave plate 36 at the precise midpoint of router 30 with its "fast" axis oriented at an angle of 450 with respect to the substrate plane, the TE and TM modes of the propagating signals will be interchanged, thereby "canceling" out the polarization dependence present in the optical signals as they propagate between waveguide arrays 32 and 34. Although the polarization dependence is essentially eliminated, the presence of the gap to accommodate half wave plate 36 results in adding signal loss (about 5 db) to the transmitted signal. In some circumstances, this amount of loss is unacceptable. Also, the capability to exactly locate the quartz plate at the precise midpoint may be problematic, resulting in less than perfect cancellation of any polarization dependence.

Figure 3:
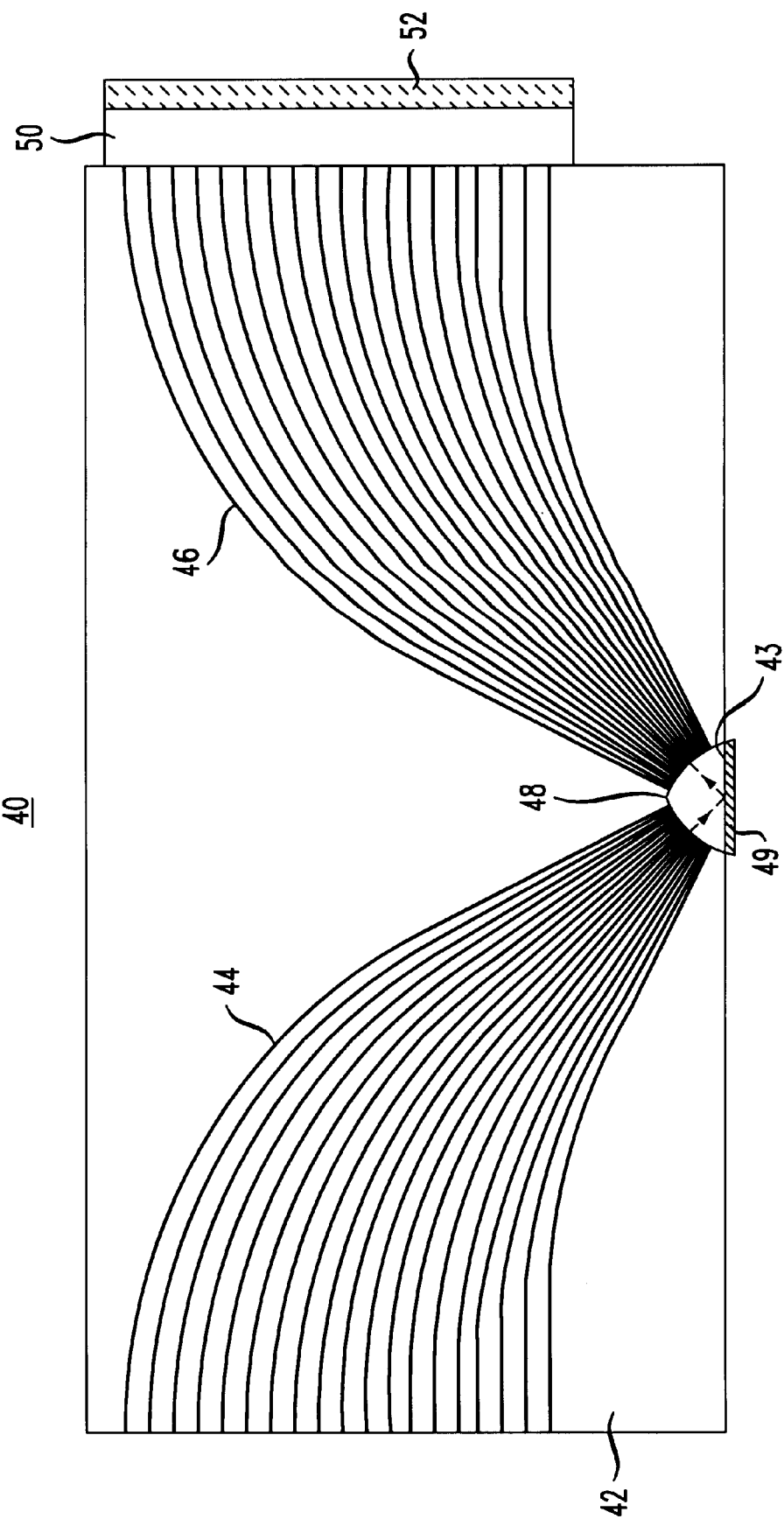
FIG. 3 is a diagram of an exemplary reflective optical router formed in accordance with the present invention.

The arrangement of the present invention provides an improved solution to the polarization problem, while also reducing the overall size of the router. FIG. 3 illustrates an exemplary reflective router 40 formed in accordance with the present invention. Router 40 is formed within an optical substrate 42 and includes a first plurality of waveguides 44 and a second plurality of waveguides 46. The pair of star couplers associated with the above-described prior art arrangements have been replaced by a single "folded" coupler 48. In the illustrated embodiment of the present invention, surface 43 of substrate 42 is coated with a mirror layer 49 so that optical signals propagating along one of the first waveguides 44 will enter folded coupler 48, reflect off of mirror layer 49 and be coupled into waveguides 46, as indicated by the arrows in FIG. 3. In an alternative embodiment, substrate 42 may itself be formed (e.g., polished) so that surface 43 provides total internal reflection to the optical signal propagating through folded coupler 48 and functions to reflect the optical signals between waveguide arrays 44 and 46. Regardless of implementation, the general aspect of the present invention is to provide for a reflective surface along the central axis of a traditional star coupler. This attribute allows for the overall size of the router to be significantly reduced. However, polarization dependence is still present in this signal. The polarization dependence is overcome in the arrangement of the present invention by positioning a quarter wave plate 50 (or, alternatively, a Faraday rotator) and reflective surface 52 at the output of the second array of N waveguides 46, as shown in FIG. 3. Therefore, an optical signal exiting a particular waveguide $46_i$ will pass through quarter wave plate 50, reflect off of surface 52, pass a second time through quarter wave plate 50 and re-enter waveguide $46_i$. Since a Faraday rotator is a non-reciprocal device, the optical signal passing therethrough will experience a "+45°" rotation during each traversal. The additive nature of these rotations therefore yields the same result (TE↔TM mode conversion) as half wave plate 36 in the prior art configuration illustrated in FIG. 2. The rotated signals thereafter make a second pass through folded coupler 48 and exit router 40 through waveguides 44. In the case of a quarter-wave plate oriented with its fast axis at 45° with respect to the plane of the substrate, the double passing of the optical signal through quarter wave plate 50 (by reflection off of mirror surface 52) makes its action equivalent to a half-wave plate with its fast axis at 45° to the plane of the substrate, thereby exchanging the TE and TM polarizations. It is to be understood that a "quarter wave plate" includes all "odd" multiples of a ¾-wave plate, since a ¾-wave plate, or a 5/4-wave plate, etc. will each provide the same degree of polarization rotation to a signal passing therethrough.

Figure 4:
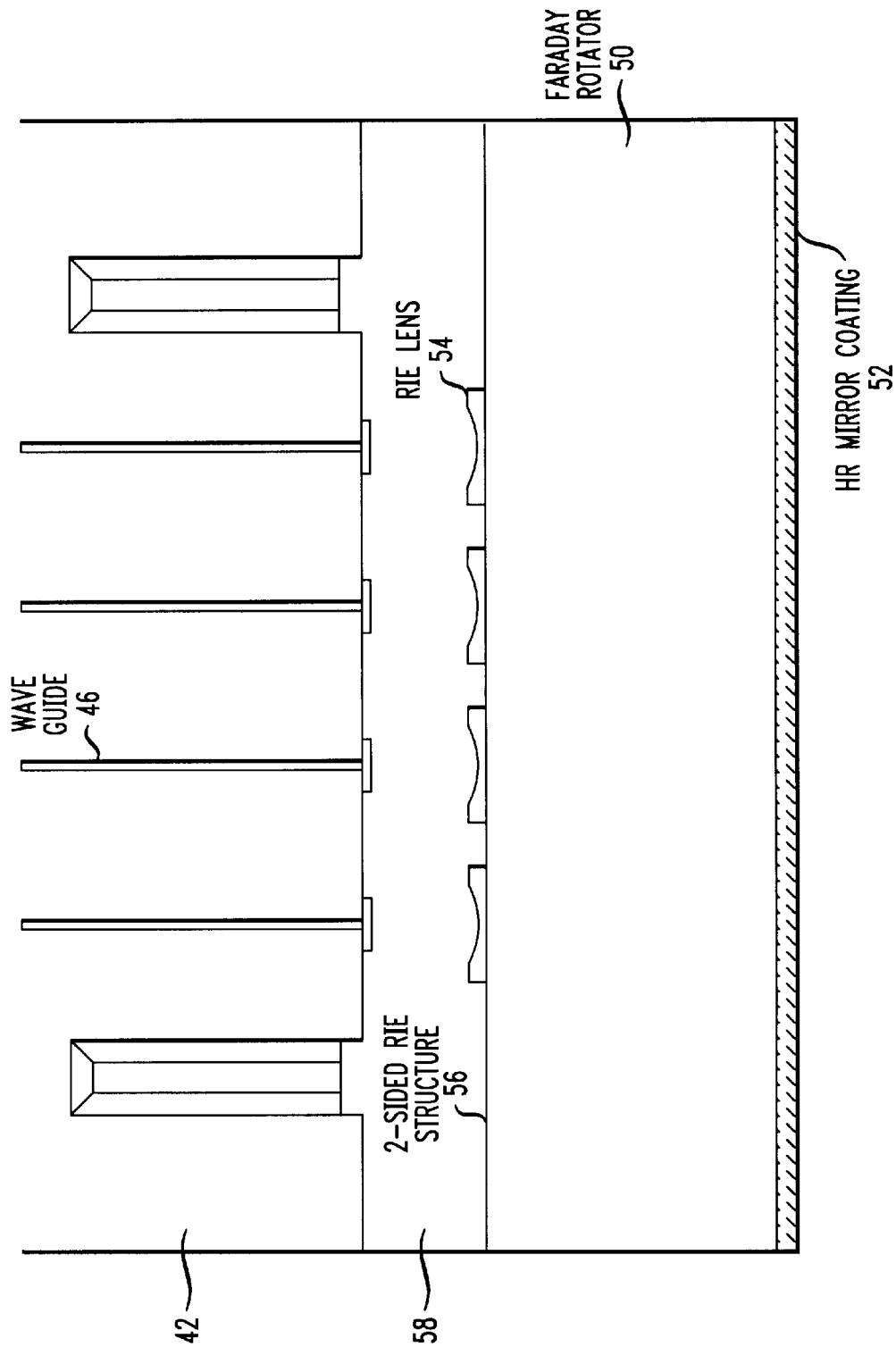
FIG. 4 illustrates an exemplary Faraday rotator/reflection arrangement, formed sing RIE techniques, useful in the reflective optical router of FIG. 3.
Figure 6:
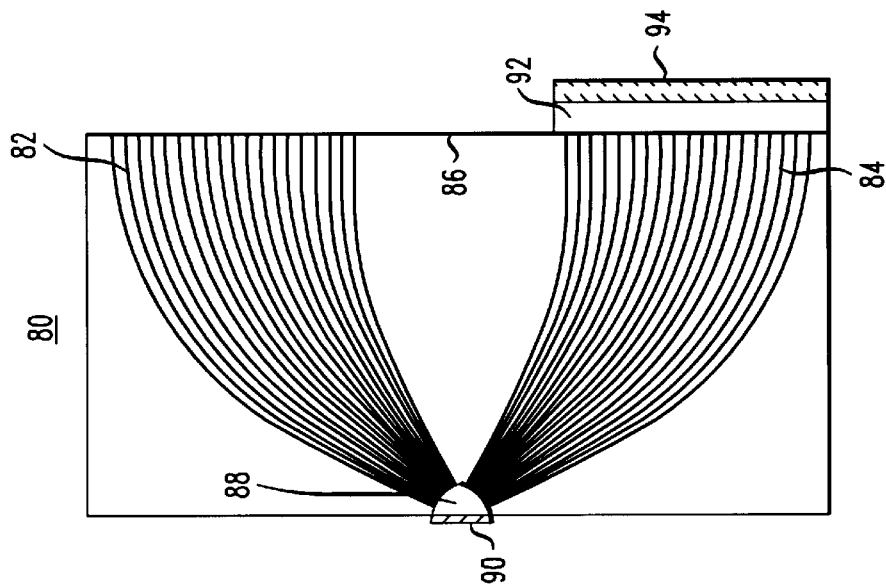
FIG. 6 illustrates yet another reflective optical router formed in accordance with the present invention.

In a preferred embodiment of the present invention, the signal losses attributed with the use of the half wave plate in the prior art may be reduced by using the arrangement illustrated in FIG. 4. FIG. 4 is a top view of the edge portion of substrate 42, illustrating in particular a subset of waveguide array 46 and an exemplary arrangement of quarter wave plate 50 and reflector 52. In this arrangement, the waveguide modes are converted to collimated beams by including reactive-ion etched (RIE) lenses 54 on surface 56 of an intermediate transparent medium 58. The use of collimated beams allows for a Faraday rotator (such as latchable garnet) to be used instead of the quarter wave plate, reducing signal loss. It is to be understood that this arrangement is exemplary only and various other quarter wave plate/Faraday rotator arrangements may be implemented when practicing the present invention.

Figure 5:
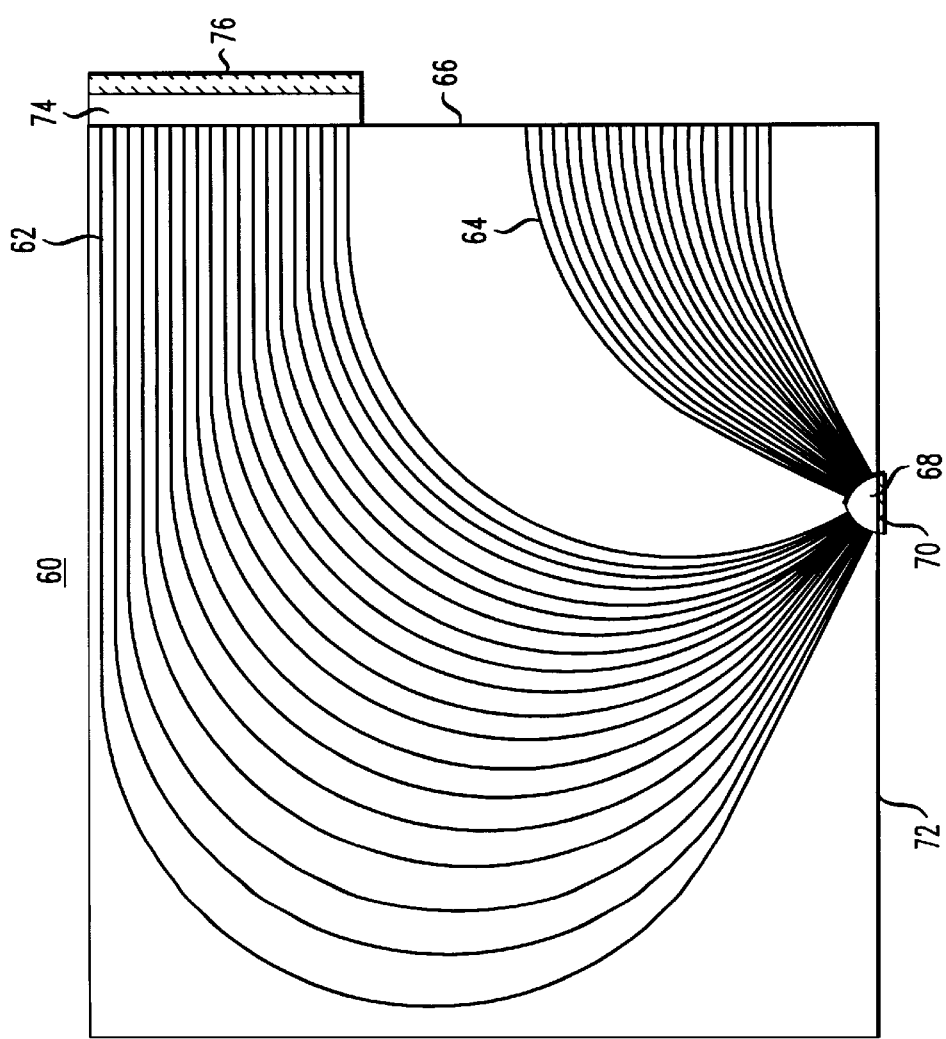
FIG. 5 illustrates an alternative reflective optical router structure of the present invention.

Alternative router geometries are possible using the reflective/quarter wave plate arrangement of the present invention. An exemplary router 60 is illustrated in FIG. 5. In this arrangement, a first waveguide array 64 and a second waveguide array 62 both terminate on the same substrate edge 66. As with the embodiment described above, the waveguide arrays are coupled through a folded star coupler 68, where a reflective surface 70 is disposed along edge 72 of router 60 to allow for signals propagating along first array 64 to be introduced into second array 62 (or, alternatively, edge 72 may be formed to provide for total internal reflection). A quarter wave plate 74 (or, alternatively, a Faraday rotator) and reflective surface 76 are disposed along edge 66 of router 60 at the output of second array 62. FIG.

6 illustrates yet another embodiment of the present invention. In this case router 80 includes a first waveguide array 82 and a second waveguide array 84, where as with the arrangement illustrated in FIG. 5, the waveguides all terminate along the same router edge 86. In this embodiment, however, a folded coupler 88 is disposed at the opposing edge of the router. As with the other arrangements of the present invention, router 80 includes a reflective surface 90 (either an external surface or a preparation of the substrate surface to provide for total internal reflection) along the exposed edge of folded coupler 88 and a quarter wave plate/Faraday rotator 92 and reflective surface 94 at the output of second waveguide array 84.

Various other waveguide/coupler geometries are possible and all are considered to fall within the spirit and scope of the present invention as defined by the claims appended hereto.

What is claimed is:

1. An optical multiplexer comprising a first array of waveguides;

a second array of waveguides;

an optical coupler disposed between said first and second arrays so as to allow for a signal propagating along any waveguide of the first array to be injected into the second array of waveguides, the optical coupler comprising a folded-Dragone form with a planar reflective surface so that a signal exiting the first array of N waveguides and propagating through said coupler will reflect off said reflective surface and be injected into said second array of waveguides;

polarization rotation means disposed along the output of said second array; and a reflective surface disposed at the output of the polarization rotation means, the combination of said polarization rotation means and said reflective surface causing a signal exiting said second waveguide array to pass through said polarization rotation means in each direction so as to undergo a polarization mode conversion and thereafter propagate through said optical coupler and exit said multiplexer at said first waveguide array.

2. An optical multiplexer as defined in claim 1 wherein the waveguide arrays and the optical coupler are formed on an optical substrate with the optical coupler disposed such that the planar surface coincides with a first edge of said substrate and the second waveguide array terminates at a separate edge with the rotation means and reflective surface coupled to said separate edge.

3. An optical multiplexer as defined in claim 2 wherein the optical substrate is defined as having two pairs of opposing edges, the first waveguide array coupled to a first edge and the second waveguide array coupled to an opposing second edge, with the optical coupler disposed along a third edge orthogonal to said first and second edges.

4. An optical multiplexer as defined in claim 2 wherein the optical substrate is defined as having two pairs of opposing edges, the first and second waveguide arrays coupled to a first edge and the optical coupler disposed along a second, different edge.

5. An optical multiplexer as defined in claim 4 wherein the optical coupler is disposed along an edge intersecting the first edge.

6. An optical multiplexer as defined in claim 4 wherein the optical coupler is disposed along an edge parallel to the first edge.

7. An optical multiplexer as defined in claim 1 wherein the multiplexer further comprises a plurality of lens elements, each lens disposed at the output of a waveguide of the second array of waveguides so as to form a collimated beam as an input to the polarization rotation means.

8. An optical multiplexer as defined in claim 1 wherein the polarization rotation means comprises a Faraday rotator.

9. An optical multiplexer as defined in claim 1 wherein the polarization rotation means comprises a quarter wave plate including a fast axis oriented at an angle of approximately 45° with respect to the optical substrate.

* * * * *